US012775296B2

(12) United States Patent
Lim

(10) Patent No.: US 12,775,296 B2
(45) Date of Patent: Oct. 27, 2026

(54) SUBSTRATE SUPPORTING UNIT AND TEMPERATURE CONTROL METHOD THEREOF

(71) Applicant: TES CO., LTD, Yongin-si (KR)

(72) Inventor: Kyung-Tae Lim, Hwaseong-si (KR)

(73) Assignee: TES CO., LTD, Yongin-si (KR)

( * ) Notice: Subject to any disclaimer, the term of this patent is extended or adjusted under 35 U.S.C. 154(b) by 717 days.

(21) Appl. No.: 18/142,523

(22) Filed: May 2, 2023

(65) Prior Publication Data

US 2023/0376055 A1 Nov. 23, 2023

(30) Foreign Application Priority Data

May 18, 2022 (KR) ........................ 10-2022-0061093

(51) Int. Cl.

| | |
|---|---|
| ***G05D 23/24*** | (2006.01) |
| ***H05B 1/02*** | (2006.01) |
| ***H05B 3/28*** | (2006.01) |

(52) U.S. Cl.

CPC ....... *G05D 23/2401* (2013.01); *H05B 1/0233* (2013.01); *H05B 3/28* (2013.01); *H05B 2203/005* (2013.01)

(58) Field of Classification Search

CPC .... G05D 23/2401; H05B 1/0233; H05B 3/28; H05B 3/283; H05B 3/286; H05B 2203/005

See application file for complete search history.

(56) References Cited

U.S. PATENT DOCUMENTS

| | | | | |
|---|---|---|---|---|
| 2017/0372928 | A1* | 12/2017 | Yamada ............. | H10P 72/0602 |
| 2021/0351051 | A1 | 11/2021 | Wirth et al. | |
| 2021/0389786 | A1* | 12/2021 | Maccioni ........... | G05D 23/1919 |

FOREIGN PATENT DOCUMENTS

| | | | |
|---|---|---|---|
| KR | 10-2022-0010567 | A | 1/2022 |
| TW | 202106918 | A | 2/2021 |

* cited by examiner

*Primary Examiner* — Michael L Sehn

(74) *Attorney, Agent, or Firm* — Park, Kim & Suh, LLC

(57) ABSTRACT

The present invention relates to a substrate support unit and a temperature control method of the substrate support unit, and more specifically, to a substrate support unit and a temperature control method of the substrate support unit, which can accurately measure and adjust the temperature of each zone when the substrate support unit that supports and heats a substrate is divided into a plurality of zones.

13 Claims, 11 Drawing Sheets

SUBSTRATE SUPPORTING UNIT AND TEMPERATURE CONTROL METHOD THEREOF

CROSS REFERENCE TO RELATED APPLICATION OF THE INVENTION

The present application claims the benefit of Korean Patent Application No. 10-2022-0061093 filed in the Korean Intellectual Property Office on May 18, 2022, the entire contents of which are incorporated herein by reference.

BACKGROUND OF THE INVENTION

Field of the Invention

The present invention relates to a substrate support unit and a temperature control method of the substrate support unit, and more specifically, to a substrate support unit and a temperature control method of the substrate support unit, which can accurately measure and adjust the temperature of each zone when the substrate support unit that supports and heats a substrate is divided into a plurality of zones.

Background of the Related Art

Generally, a chamber that performs various processes such as deposition, etching, and the like on a substrate is provided with a substrate support unit for supporting the substrate inside the chamber. A heater is provided in the substrate support unit to heat the substrate to an appropriate temperature.

FIG. 11 is a view showing a substrate support unit 40 according to the prior art. Referring to FIG. 11, the substrate support unit 40 includes a susceptor 10. The susceptor 10 is divided into a center area 12 and an edge area 14, and a heater unit is provided in the center area 12 and the edge area 14 to heat the substrate, respectively. In this case, an alternating current (AC) voltage is provided to the heater units. In addition, a first output control unit 22 and a second output control unit 24 for adjusting the output of the AC voltage are respectively connected to the heater units of the center area 12 and the edge area 14.

When the substrate is heated by the substrate support unit 40 according to the prior art, a thermocouple 2 is used to accurately measure the temperature of the heater units. The thermocouple 2 is installed to directly contact the center area 12 and measures the temperature of the center area 12.

A control unit 30 compares the temperature measured by the thermocouple 2 with an appropriate temperature according to the process and controls the first and second output control units 22 and 24 to adjust the temperature of the center area 12 and the edge area 14.

However, in the case of the substrate support unit 40 according to the prior art, it is difficult to accurately measure the temperature of the entire center area 12 since the thermocouple 2 directly contacts, and only the temperature of the contacted local area can be measured. In addition, when a contact sensor such as the thermocouple is used, it is difficult to install the thermocouple in the edge area 14. That is, a wire is connected to the thermocouple 2 through a lower support bar 16 of the substrate support unit 40, and when the thermocouple is installed in the edge area 14, it is difficult to install the wire.

Accordingly, in the substrate support unit 40 according to the prior art, the thermocouple 2 is installed only in the center area 12, and the temperature of the edge area 14 is equally controlled according to the temperature of the center area 12. However, since this control method is not based on an accurate temperature of the edge area 14 of the substrate support unit 40, the process on the substrate cannot be performed smoothly.

SUMMARY OF THE INVENTION

Therefore, the present invention has been made in view of the above problems, and it is an object of the present invention to provide a substrate support unit and a temperature control method, which can accurately measure the temperature of each area even when a substrate is heated by dividing the substrate support unit into two or more areas.

In addition, another object of the present invention is to provide a substrate support unit and a temperature control method, which can calculate an accurate resistance value even when the output changes instantaneously.

Furthermore, another object of the present invention is to provide a substrate support unit and a temperature control method, which can prevent leakage current, which can be generated in an existing structure that uses AC voltage, by using DC voltage, and improve ESC chucking efficiency through insulation of a DC voltage supply terminal.

To accomplish the above objects, according to one aspect of the present invention, there is provided a substrate support unit comprising: a susceptor supporting a substrate; a resistance element provided in the susceptor to heat the substrate; a DC supply unit directly connected to the resistance element to apply DC voltage; and a control unit for calculating a temperature of the resistance element by measuring a voltage value and a resistance value of the resistance element and adjusting the temperature of the resistance element through the DC voltage control.

Here, the susceptor may be divided into two or more areas, and the resistance element may be disposed in each of the two or more areas, and the DC supply unit may be directly connected to each of the resistance elements disposed in the two or more areas to independently apply DC voltage.

Furthermore, two or more DC supply unit may be provided to be independently connected to each of the resistance elements.

In addition, the susceptor may be divided into a first area disposed in a center region and a second area disposed in an edge region, and the resistance element may include a first resistance element disposed in the first area and a second resistance element disposed in the second area.

Meanwhile, the control unit may be provided with an analog-digital converter (ADC) channel for processing voltage value of the resistance element and an analog-digital converter channel for processing resistance values of the resistance element.

In addition, a resistance-temperature table in which the resistance values of the resistance elements are converted into temperatures may be stored in the control unit.

In this case, the temperatures in the resistance-temperature table may be determined by an equation according to resistances and temperatures of the resistance elements.

Furthermore, the temperatures in the resistance-temperature table may be provided through calibration of calculating a resistance value per unit temperature or a temperature coefficient of resistance $\alpha$ by directly measuring the temperatures of the resistance elements or the substrate.

Meanwhile, the DC supply unit may include an AC input terminal for receiving AC voltage, a transformer, a rectifier for converting AC to DC, and a DC output terminal for outputting DC voltage, and an insulation member is included in the transformer.

In this case, the susceptor further includes an ESC electrode for chucking the substrate, wherein a chucking DC supply unit for supplying a DC voltage to the ESC electrode includes an AC input terminal for receiving AC voltage, a transformer, a rectifier for converting AC to DC, and a DC output terminal for outputting DC voltage, and an insulation member is included in the transformer.

Meanwhile, to accomplish the above objects, according to one aspect of the present invention, there is provided a temperature control method of a substrate supporting unit having a susceptor provided with a resistance element for heating a substrate, the method comprising the steps of: measuring a resistance value of the resistance element; calculating a temperature corresponding to the measured resistance value; and generating a resistance-temperature table including the resistance value and the temperature of the resistance element by repeating the steps of measuring a resistance value of the resistance element and calculating a temperature corresponding to the measured resistance value.

Here, the temperature control method may further comprise the step of adjusting the temperature of the resistance element in a process for the substrate, wherein the step of adjusting the temperature of the resistance element includes the steps of: supplying DC voltage to the resistance element from a DC supply unit; measuring a resistance value of the resistance element; extracting a temperature corresponding to the measured resistance value of the resistance element from the resistance-temperature table; and adjusting the DC voltage supplied from the DC supply unit to the resistance element by comparing the extracted temperature value with a temperature required in a process for the substrate.

Furthermore, the temperature control method may further comprise, after the step of calculating a temperature corresponding to the measured resistance value, the step of providing the temperature of the resistance-temperature table through calibration of calculating a resistance value per unit temperature or a temperature coefficient of resistance($\alpha$) by directly measuring the temperature of the resistance element or the substrate.

DETAILED DESCRIPTION OF THE PREFERRED EMBODIMENT

Hereinafter, the structure of the substrate support unit according to an embodiment of the present invention will be described in detail with reference to the drawings.

Figure 1:
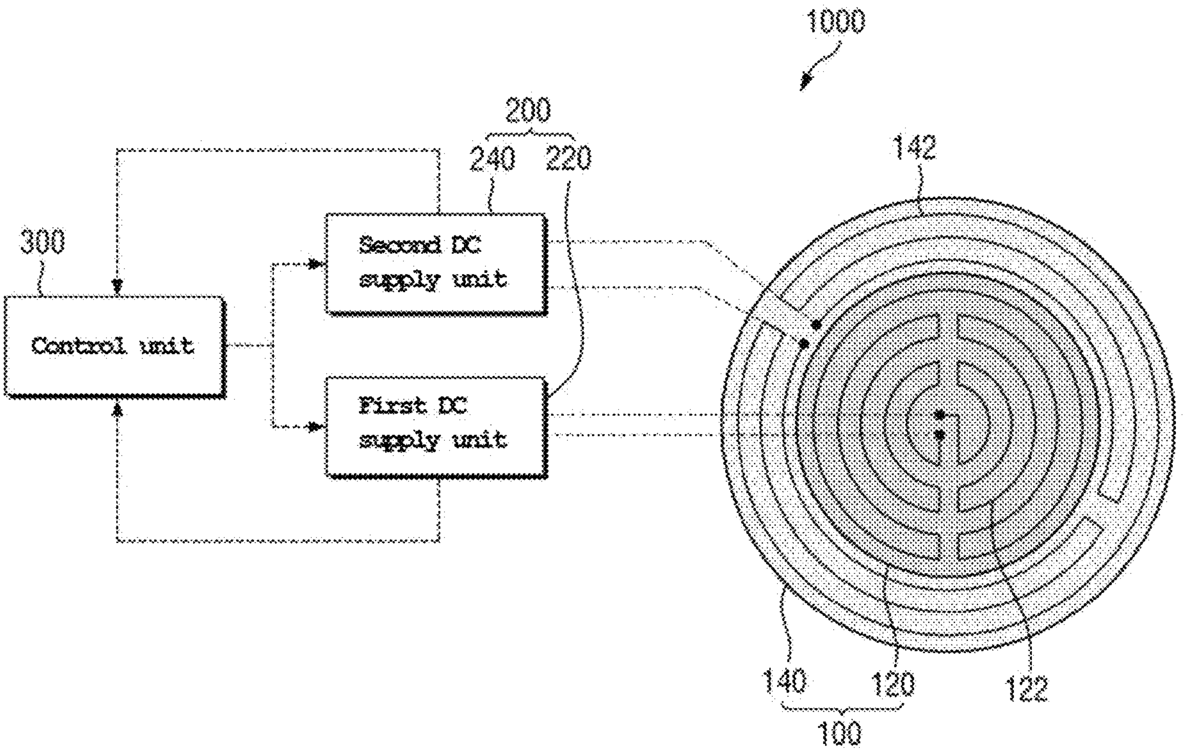
FIG. 1 is a view schematically showing the configuration of a substrate support unit according to an embodiment of the present invention.

FIG. 1 is a view schematically showing the configuration of a substrate support unit 1000 according to an embodiment of the present invention.

Referring to FIG. 1, the substrate support unit 1000 includes a susceptor 100 for supporting a substrate S (see FIGS. 3A to 3C), resistance elements 122 and 142 provided in the susceptor 100 to heat the substrate, a DC supply unit 200 connected to the resistance elements 122 and 142 to apply DC voltage, and a control unit 300 for calculating temperatures of the resistance elements 122 and 142 by measuring resistance values of the resistance elements 122 and 142, and adjusting temperatures of the resistance elements 122 and 142 through the DC voltage controlled by the DC supply unit 200.

In the present invention, the temperatures of the resistance elements 122 and 142 are accurately calculated by measuring the resistance values of the resistance elements 122 and 142 provided in the susceptor 100. The temperature of a second area 140 near the edge, as well as the temperature of a first area 120 at the center of the susceptor 100, can be measured accurately by adopting a method of calculating temperatures by measuring the resistance values of the resistance elements 122 and 142.

As shown in FIG. 1, the susceptor 100 is disposed inside a chamber (not shown) to support the substrate. In addition, the resistance elements 122 and 142 are disposed in the susceptor 100 to heat the substrate to an appropriate temperature according to a process.

In this case, the susceptor 100 may be divided into two or more areas. For example, as shown in the drawing, it may be divided into a first area 120 disposed in the center region and a second area 140 disposed in the edge region.

Dividing an area in this way is only an example, and the susceptor 100 may also be divided into a larger number of areas or in other forms. Hereinafter, it will be described assuming a case of dividing the susceptor 100 into the first area 120 and the second area 140.

When the susceptor 100 is divided into two or more areas, the resistance elements 122 and 142 may be disposed in the two or more areas, respectively. That is, the first resistance element 122 may be disposed in the first area 120, and the second resistance element 142 may be disposed in the second area 140. In this case, the first resistance element 122 and the second resistance element 142 are disposed to be evenly distributed along the first area 120 and the second area 140, respectively, so that the first area 120 and the second area 140 may be uniformly heated.

Meanwhile, the substrate support unit 1000 according to the present invention may include a DC supply unit 200 connected to the resistance elements 122 and 142 to apply DC voltage.

That is, in the present invention, a DC voltage is applied to the resistance elements 122 and 142 to heat the substrate. This is to accurately measure the resistance values of the resistance elements 122 and 142. As described above, the substrate support unit according to the prior art heats the substrate by applying alternating current (AC) voltage. Since the polarity of the AC voltage changes periodically, it is difficult to measure an accurate resistance value due to the AC waveform characteristics of changing phase and polarity when the resistance values of the resistance elements are measured in case of applying AC voltage to the resistance elements. In addition, even in the case of ADC timing calibration, which will be described below, it is also difficult to work using an AC voltage having the AC waveform characteristics of changing phase and polarity. Accordingly, in the present invention, the temperatures of the resistance elements 122 and 142 are accurately calculated by applying a DC voltage having a fixed phase and polarity.

In addition, in the present invention, a separate means for accurately calculating the temperature in each area of the susceptor 100 is not needed, and the temperature is calculated in a method of measuring resistance value by directly applying a DC voltage to the resistance elements 122 and 142 provided in the susceptor 100. Accordingly, the substrate support unit 1000 according to the present invention may accurately calculate the temperature of the susceptor 100 even with a simple configuration.

Furthermore, the substrate support unit 1000 according to the present invention has an advantage in that it can be applied to a prior art susceptor having resistance elements 122 and 142 for heating. That is, by adopting the configuration of applying a DC voltage to the susceptor according to the prior art, there is an advantage in that it can be applied without the need of replacing or processing the resistance elements or changing the structure in the susceptor according to the prior art.

Meanwhile, the DC supply unit 200 may be directly connected to each of the resistance elements 122 and 142 disposed in the two or more area to independently apply DC voltage.

For example, the DC supply unit 200 may be configured of a first DC supply unit 220 for applying DC voltage to the first resistance element 122 of the first area 120 and a second DC supply unit 240 for applying DC voltage to the second resistance element 142 of the second area 140. That is, when the susceptor 100 is divided into two or more areas, two or more DC supply units 200 may be provided to be independently connected to each of the resistance elements 122 and 142.

Meanwhile, although not shown in the drawing, when the susceptor 100 is divided into two or more areas and each of the areas has a resistance element, only one DC supply unit 200 may be provided. In this case, the output line of the single DC supply unit may be branched and connected to each resistance element, and a variable resistor or the like may be provided in the branched output lines to supply different voltages to two or more resistance elements by adjusting the resistance value of the variable resistor.

Meanwhile, the control unit 300 measures resistance values of the resistance elements 122 and 142 and calculates temperatures of the resistance element 122 and 142 on the basis of the measured resistance values, and adjusts temperatures of the resistance elements 122 and 142 by controlling the DC voltage of the DC supply unit 200 on the basis of the calculated temperatures.

That is, the temperature control method of the substrate support unit 1000 includes the steps of measuring resistance values of the resistance elements 122 and 142, calculating temperatures corresponding to the measured resistance values, and generating a resistance-temperature table including the resistance values and temperatures of the resistance elements 122 and 142 by repeating the steps of measuring resistance values of the resistance elements 122 and 142 and calculating temperatures corresponding to the measured resistance values.

Furthermore, the temperature control method may further include a step of adjusting temperatures of the resistance elements 122 and 142 in the process for the substrate S.

Figure 2:
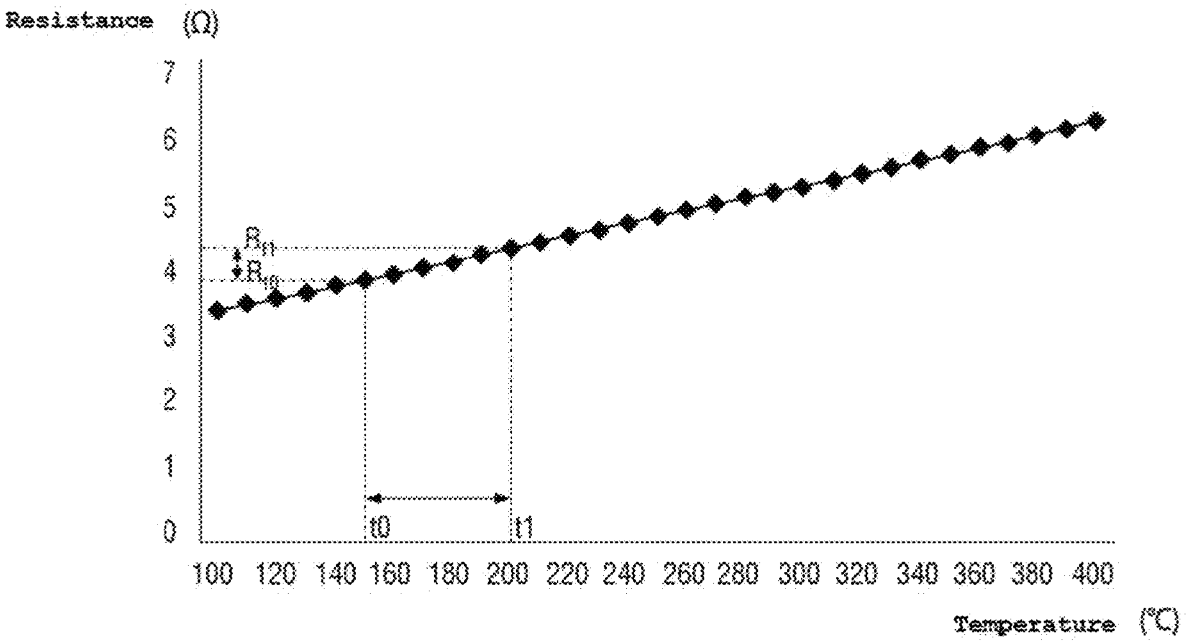
FIG. 2 is a graph showing the relation between resistance and temperature of a resistance element in a substrate support unit.

FIG. 2 is a graph showing the relation between the resistance and temperature of the resistance elements 122 and 124 in the substrate support unit 1000. In FIG. 2, for example, the resistance value and temperature of the first resistance element 122 are measured and displayed. In FIG. 2, the horizontal axis represents the temperature, and the vertical axis represents the resistance value.

Referring to FIG. 2, it can be seen that the resistance value and the temperature of the first resistance element 122 are linearly proportional. In this case, arbitrary first resistance $R_{t1}$ may be defined as shown in [Equation 1].

$$R_{t1} = R_{t0}[1 + \alpha(t_1 - t_0)] \quad \text{[Equation 1]}$$

Here, α corresponds to the temperature coefficient of resistance.

For example, when the reference resistance $R_{t0}$ is measured at the reference temperature to and a first resistance $R_{t1}$ is measured at an arbitrary first temperature $t_1$, the temperature coefficient of resistance(α) is calculated as shown in [Equation 2].

$$\alpha = \frac{(R_{t1} - R_{t0})}{(t_1 - t_0)R_{t0}} \quad \text{[Equation 2]}$$

Therefore, when an arbitrary second resistance $R_{t2}$ is measured while the temperature coefficient of resistance α is known in addition to the reference temperature to and the reference resistance $R_{t0}$ of the first resistance element 122, the second temperature $t_2$ corresponding to the second resistance $R_{t2}$ can be calculated as shown in [Equation 3].

$$t_2 = t_0 + \frac{(R_{t2} - R_{t0})}{\alpha R_{t0}} \quad \text{[Equation 3]}$$

That is, when the resistance value of the first resistance element 122 is measured, the temperature can be calculated through [Equation 3].

Accordingly, a temperature corresponding to the resistance value measured through the step of measuring resistance values of the resistance elements 122 and 142 and the step of calculating temperatures corresponding to the measured resistance values can be calculated. Furthermore, a resistance-temperature table including resistance values and temperatures of the resistance elements 122 and 142 can be generated by repeating the steps of measuring resistance values of the resistance elements 122 and 142 and calculating temperatures corresponding to the measured resistance values.

In this way, in order to convert the corresponding resistance value of the first resistance element 122 into a temperature value, it is preferable to use a product capable of configuring an analog input channel and resistance-temperature table logic in the control unit 300. In addition, this can be equally applied to the second resistance element 142.

Accordingly, a resistance-temperature table containing temperatures of the resistance elements 122 and 142 corresponding to various resistance values of the resistance elements 122 and 142 may be stored in the control unit 300 described above. In this case, the temperature values of the resistance-temperature table may be determined by the equation described above according to the resistances and temperatures of the resistance elements 122 and 142.

Meanwhile, the control unit 300 may control the temperatures of the resistance elements 122 and 142 in the process for the substrate S.

The step of adjusting temperatures of the resistance elements 122 and 142 may include the steps of supplying DC voltage to the resistance elements 122 and 142 from a DC supply unit 200, measuring resistance values of the resistance elements 122 and 142, extracting temperatures corresponding to the measured resistance values of the resistance elements 122 and 142 from the resistance-temperature table, and adjusting the DC voltage supplied from the DC supply unit 200 to the resistance elements 122 and 142 by comparing the extracted temperature values with a temperature required in the process for the substrate S.

First, when the resistance value of the first resistance element 122 or the second resistance element 142 is measured, the control unit 300 may extract a temperature value corresponding to the measured resistance value from the resistance-temperature table.

The temperature may be adjusted by comparing the temperature value calculated as described above with a temperature required in the process for the substrate and adjusting DC voltage supplied from the DC supply unit 200.

Meanwhile, calibration may be performed in order to more accurately calculate the temperature value by [Equation 3] described above.

That is, after the step of calculating temperatures corresponding to the measured resistance values, the temperature control method of the substrate support unit 1000 described above may further include the step of providing the temperatures of the resistance-temperature table through calibration of calculating a resistance value per unit temperature or a temperature coefficient of resistance($\alpha$) by directly measuring the temperatures of the resistance elements 122 and 142 or the substrate S.

Figure 3C:
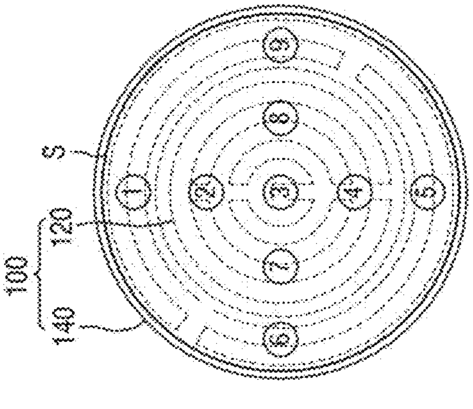
FIGS. 3A to 3C are views showing a process of calibrating the relation between the temperature measured on the substrate and the temperature of the resistance element in the substrate support unit.
Figure 3B:
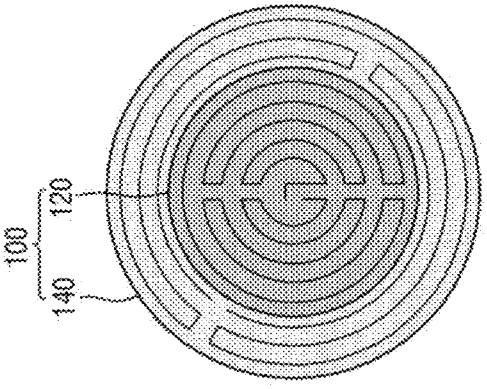
Figure 3A:
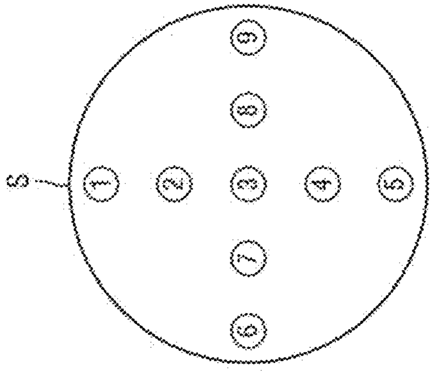

FIGS. 3A to 3C are views showing a process of calibration performed in the substrate support unit 1000.

Referring to FIGS. 3A to 3C, first, the calibration may be performed by directly measuring temperatures of the resistance elements 122 and 142 or the substrate S. In this embodiment, as shown in FIG. 3A, a plurality of temperature measurement points may be set on the substrate S, and a temperature sensor may be mounted at each point.

Subsequently, the substrate S is mounted on the top surface of the susceptor 100 prepared as shown in FIG. 3B (FIG. 3C), and temperature values are measured at the temperature measurement points of the substrate S while increasing the temperatures of the first resistance element 122 and the second resistance element 142 at predetermined temperature intervals (e.g., 100° C. intervals).

Figure 4:
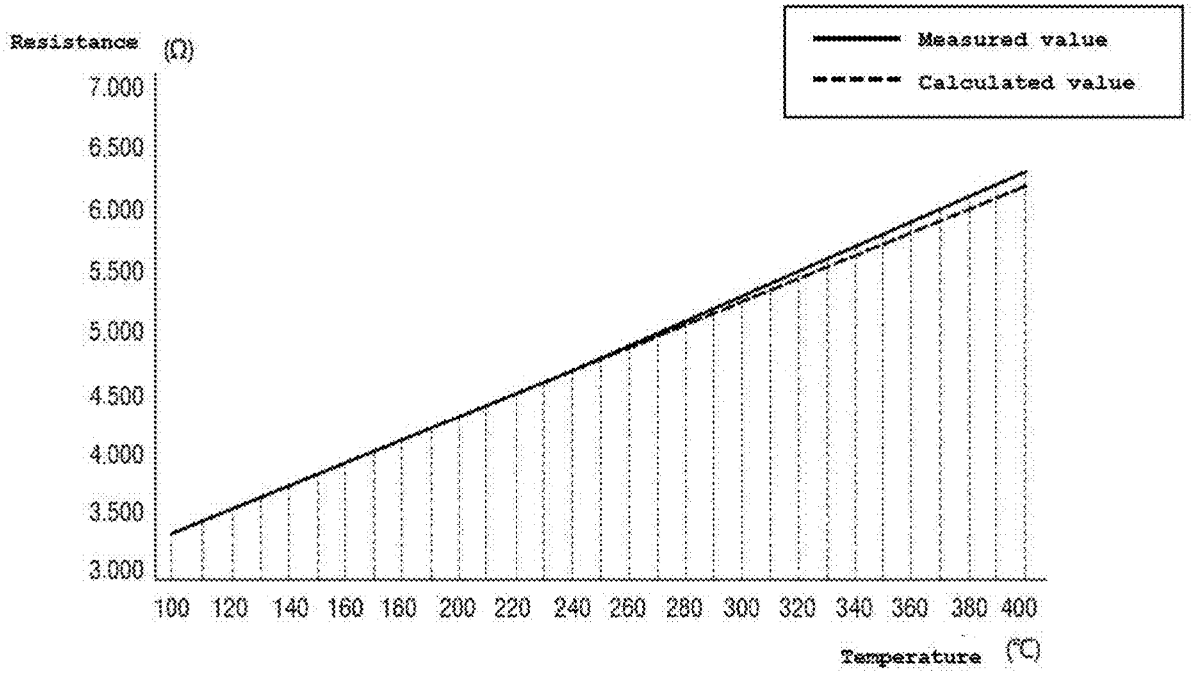
FIG. 4 is a graph showing calculated values and measured values according to the calibration according to FIGS. 3A to 3C.

FIG. 4 is a graph showing values measured according to the calibration described above and values calculated by the equations. In FIG. 4, the horizontal axis shows temperature and the vertical axis shows resistance. Here, the calculated values are obtained by applying the temperature coefficients of resistance $\alpha$ calculated based on 100° C. and 200° C.

As shown in FIG. 4, it can be seen that the values calculated by the equation described above almost correspond to the measurement values actually measured in the calibration according to FIGS. 3A to 3C. However, as the temperature increases, errors occur to some extent. It can be seen that this error increases as the distance from the reference temperature (100 and 200° C.) for calculating the temperature coefficient of resistance($\alpha$) increases.

Therefore, when the range of the reference temperature for calculating the temperature coefficient of resistance($\alpha$) is increased and repeatedly applied in units of 100° C., the error between the calculated value and the actually measured value can be reduced. Alternatively, when the temperature interval for actually measuring the temperatures of the resistance elements 122 and 142 is reduced to be smaller than 100° C. and applied in the calibration according to FIGS. 3A to 3C, the error between the calculated value and the actually measured value can be reduced.

As a result, the resistance value per unit temperature or the temperature coefficient of resistance $\alpha$ can be calculated more accurately through the calibration step described above, and therefore, the temperature values of the resistance-temperature table provided in the control unit 300 can be provided more accurately.

Figure 5A:
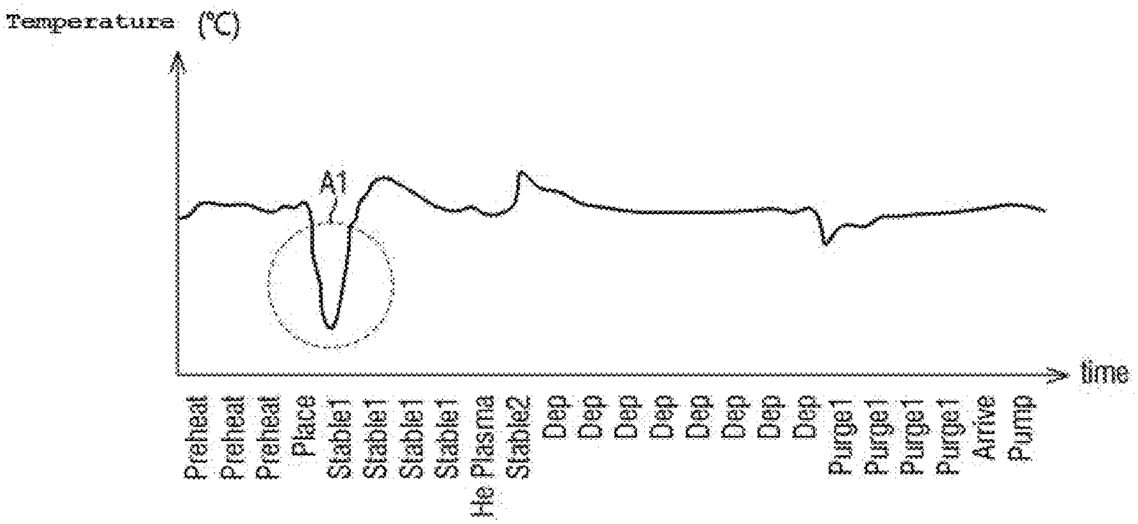
FIGS. 5A to 5B are graphs showing temperature control of the substrate support unit according to the prior art and temperature control of the substrate support unit according to the present invention.
Figure 5B:
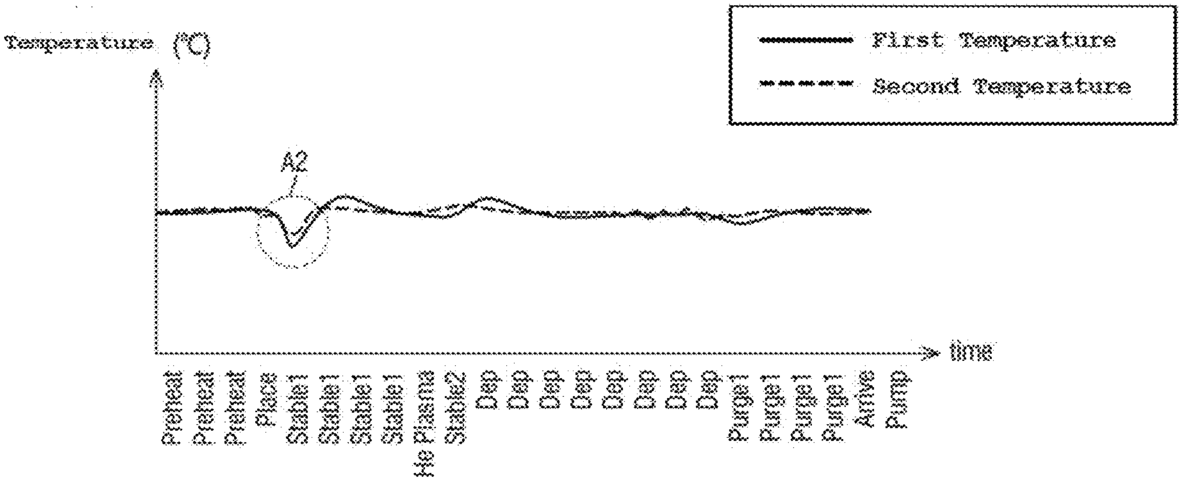

FIGS. 5A to 5B are graphs showing temperature control A of the substrate support unit 1000 according to the prior art and temperature control B of the substrate support unit 1000 according to the present invention. In FIGS. 5A to 5B, the horizontal axis shows the process sequence according to time, and the vertical axis shows the temperature of the substrate.

Referring to FIG. 5A, when only the temperature value of the center area of the substrate support unit 1000 is measured by the thermocouple, the center area and the edge area are controlled with the same temperature value. Accordingly, as control corresponding to an actual temperature value is not performed in the edge area, efficiency of the process for the substrate is lowered.

In addition, it can be seen that when a disturbance occurs (area 'A1'), such as a case where the gas for adjusting chamber pressure is supplied to the inside of the chamber as shown in FIG. 5A, as it takes time to detect the change in the temperature of the thermocouple in the control according to the prior art, the change is difficult to handle immediately, so the temperature changes greatly.

The disturbance described above may also occur when plasma is discharged inside the chamber or when a purge gas flows into the chamber, and also in this case, it is difficult to immediately handle increase or decrease of the temperature in the case of the substrate support unit according to the prior art.

Furthermore, in the case of the substrate support unit according to the prior art, when the temperatures of the resistance elements are increased or decreased in response to occurrence of disturbance as shown in FIG. 5A, the speed of the thermocouple for detecting the change in the temperature is low, and therefore, it is difficult to precisely control since the temperatures are temporarily increased or decreased compared to a desired temperature.

On the other hand, as both a first temperature of the first area 120 and a second temperature of the second area 140 can be calculated in the control according to the present invention as shown in FIG. 5B, temperature in the first area 120 and the second are 140 can be controlled individually.

In addition, since control is performed, in the present invention, according to the resistance values of the first resistance element 122 and the second resistance element 142 of the first area 120 and the second area 140 ('A2' area), it can be seen that disturbance can be handled immediately even when the disturbance occurs, and change in the temperature is remarkably smaller than that of FIG. 5A.

Furthermore, even when plasma is discharged from the inside of the chamber or when a purge gas flows into the chamber, temperature of the substrate support unit 1000 can be maintained more stably compared to the prior art.

In addition, since changes in the electrical resistance values of the resistance elements 122 and 142 can be handled immediately in the present invention, it can be confirmed that when temperature is controlled to be increased or decreased, the range of temperature temporarily increasing or decreasing more than a desired temperature is significantly smaller than that of the prior art.

Figure 6B:
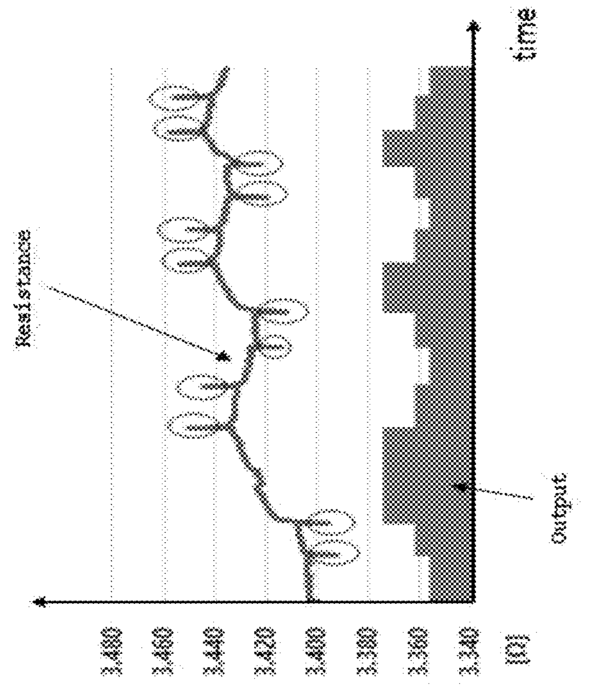
FIGS. 6A to 6B are views showing the configuration of a control unit and changes in the resistance value when the output of a DC supply unit is changed in the substrate support unit according to an embodiment.
Figure 6A:
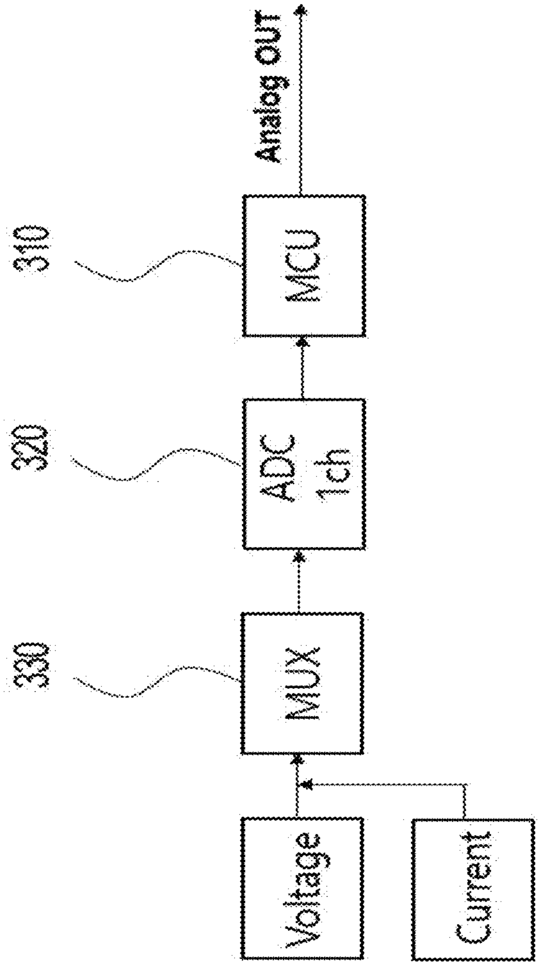

FIGS. 6A to 6B are views showing the configuration of the control unit 300 and changes in the resistance values when the output of the DC supply unit 200 is changed in the substrate support unit according to an embodiment. FIG. 6A is a view showing the configuration of the control unit 300, and FIG. 6B is a graph showing changes in the resistance value when the output of the DC supply unit 200 is changed.

Referring to FIG. 6A, an analog-digital converter (ADC) 320 having a single channel is provided in this embodiment. Therefore, measured voltage values and resistance values passing through the multiplexor (MUX) 330 and the ADC 320 are converted by the micro controller unit (MCU) 310 to be provided as analog values.

In this case, as an error may occur in calculating the resistance values in the parts where the output is changed as shown in FIG. 6B, a phenomenon of amplifying and distorting the resistance values not to match the actual values (circles in FIG. 6B) may occur. In this case, since the momentarily distorted resistance values are converted into temperatures that do not match actual heater temperature, the temperature cannot be controlled by the resistance, and furthermore, the heater may be damaged.

Figure 7B:
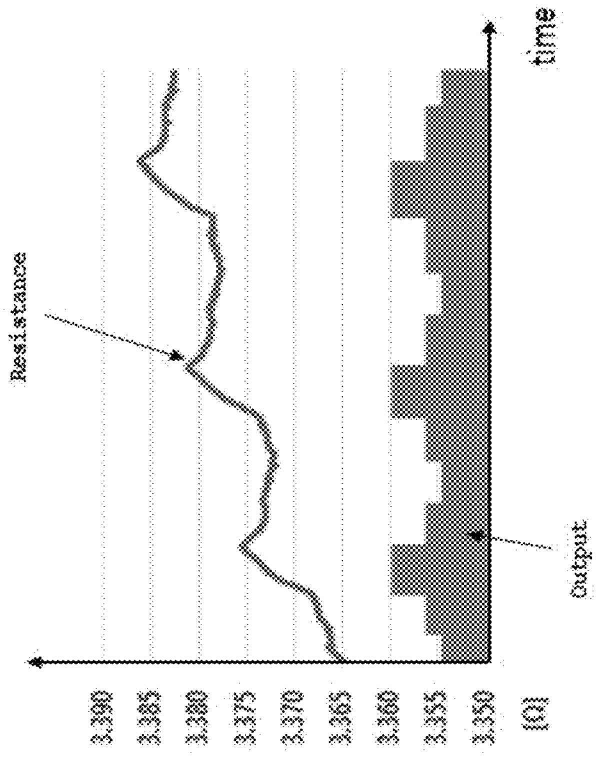
FIGS. 7A to 7B are views showing the configuration of a control unit and changes in the resistance value when the output of a DC supply unit is changed in the substrate support unit according to another embodiment.
Figure 7A:
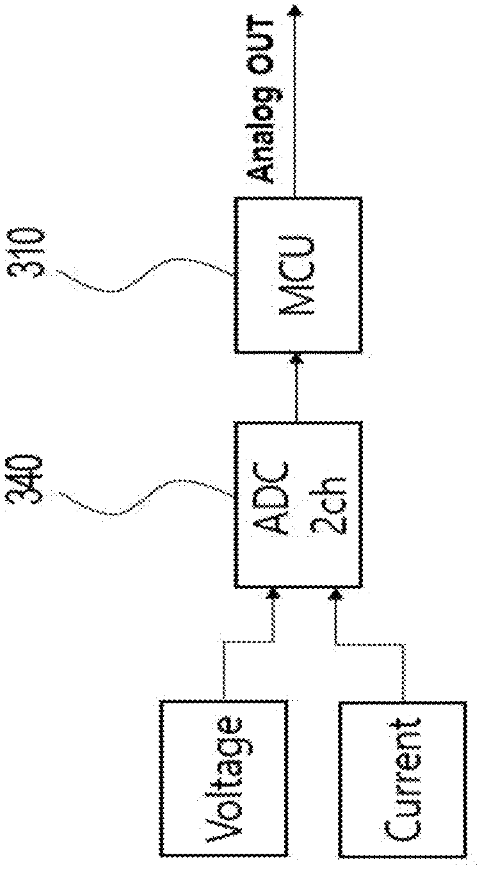

FIGS. 7A to 7B are views showing the configuration of the control unit 300 for solving the problems described above and changes in the resistance value when the output of the DC supply unit 200 described above is changed. FIG. 7A is a view showing the configuration of the control unit 300 according to another embodiment, and FIG. 7B is a graph showing changes in the resistance value when the output of the DC supply unit 200 is changed.

Referring to FIG. 7A, in this embodiment, the control unit may be provided with an analog-digital converter (ADC) channel for processing voltage value of the resistance element and an analog-digital converter channel for processing resistance values of the resistance element.

That is, an analog-digital converter (ADC) 340 is provided as a configuration having two channels and performs an ADC timing calibration work by simultaneously processing measured resistance values and voltage values.

In this case, the problem described above is improved by separating the channels inside the ADC 340 to enable setting of the ADC of each channel, and through this process, a resistance value proportional to temperature can be accurately calculated even when the output changes instantaneously as shown in FIG. 7B.

Figure 8:
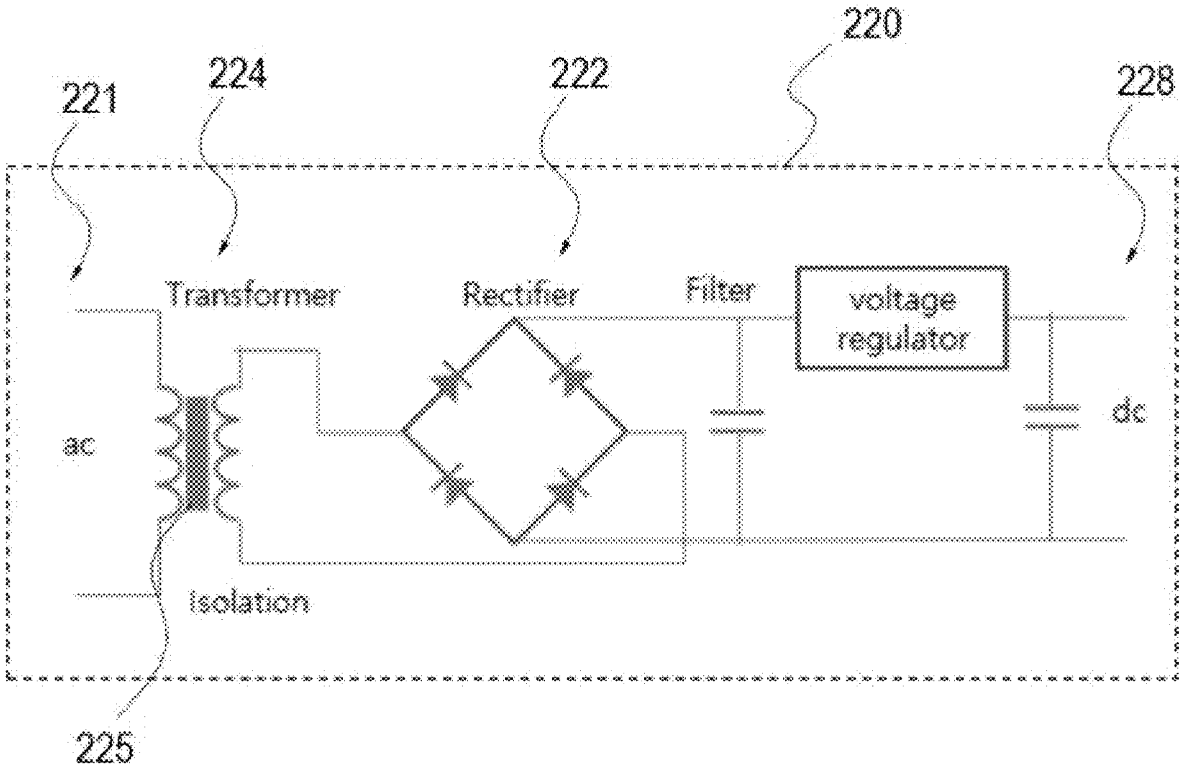
FIG. 8 is a view schematically showing the internal configuration of any one of the DC supply units.

On the other hand, FIG. 8 is a view schematically showing the internal configuration of any one of the DC supply units 200 described above. Hereinafter, the first DC supply unit 220 will be described as an example.

Referring to FIG. 8, the first DC supply unit 220 includes an AC input terminal 221 for receiving AC voltage, a transformer 224, a rectifier 222 for converting AC to DC, and a DC output terminal 228 for outputting DC voltage.

In this case, the first DC supply unit 220 may include an insulation member 225 in the transformer 224. The insulation member 225 insulates the AC input terminal 221 and the DC output terminal 228 to be insulated from leakage current that may compositely occur at the AC input terminal 221. In addition, when AC is used like a device according to the prior art, AC leakage current is generated by the parallel combination of the capacitive component and the DC resistance between a voltage generation source and the ground conductor of equipment, whereas in the case of using DC as shown in the present invention, as DC leakage current is generated at the final equipment stage, it is not serious in comparison to AC, and is efficient from the aspect of leakage current.

In addition, even in the case of chucking voltage, chucking efficiency of the electrostatic chuck (ESC) electrode 150 (see FIG. 9) can be improved by insulating the leakage current by applying the structure of the insulation member 225 described above to a chucking DC supply unit.

Figure 9:
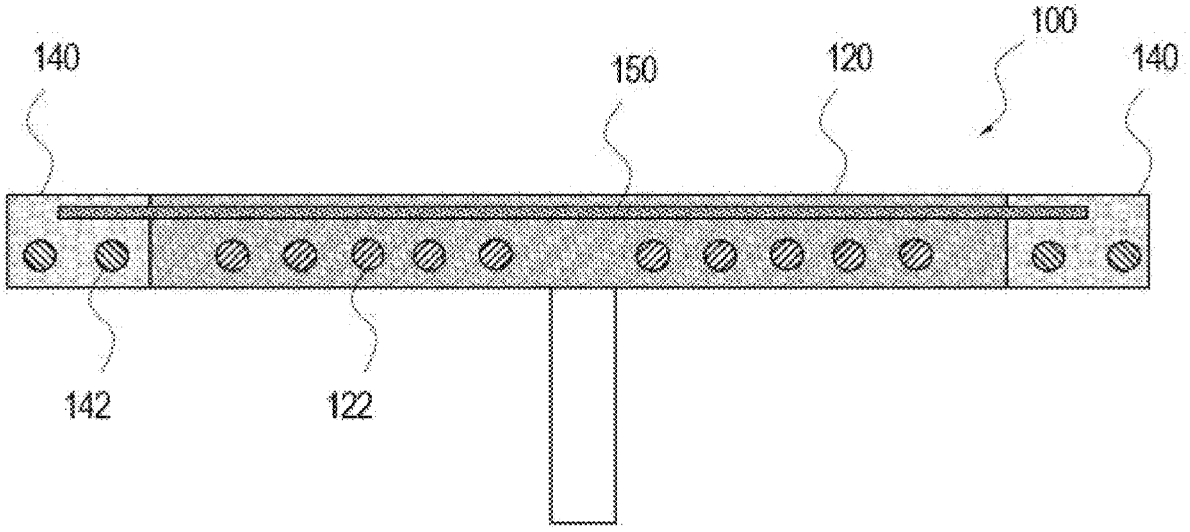
FIG. 9 is a cross-sectional view of a susceptor showing a structure in which an ESC electrode is disposed in the susceptor.

FIG. 9 is a cross-sectional view of the susceptor 100 showing a structure in which the ESC electrode 150 is disposed in the susceptor 100.

Referring to FIG. 9, the ESC electrode 150 is located in the inner top portion of the susceptor 100, and the first resistance element 122 and the second resistance element 142 described above may be disposed under the ESC electrode 150.

Figure 10A:
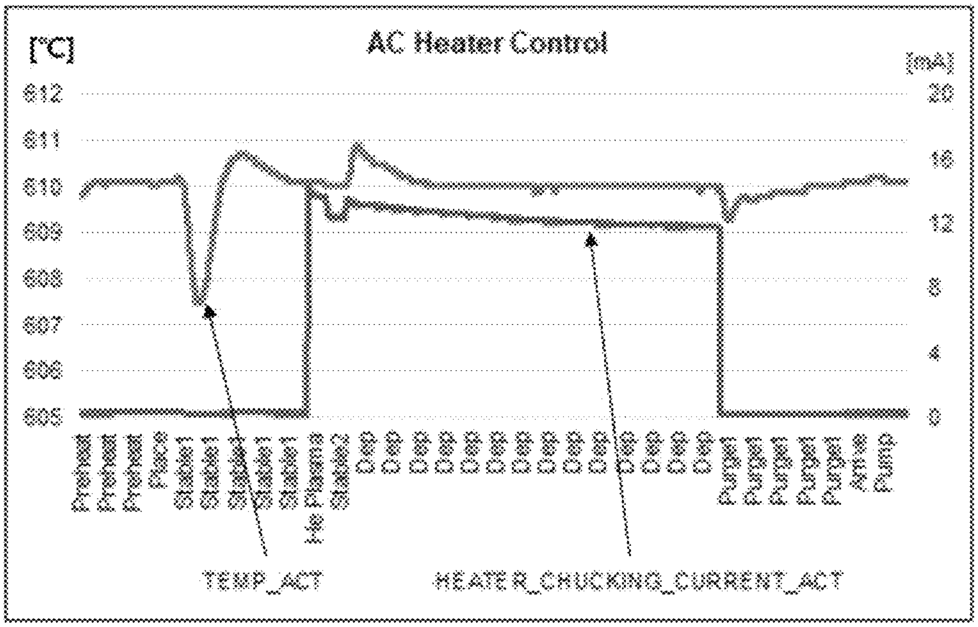
FIGS. 10A to 10B are graphs showing chucking current of an ESC electrode.
Figure 10B:
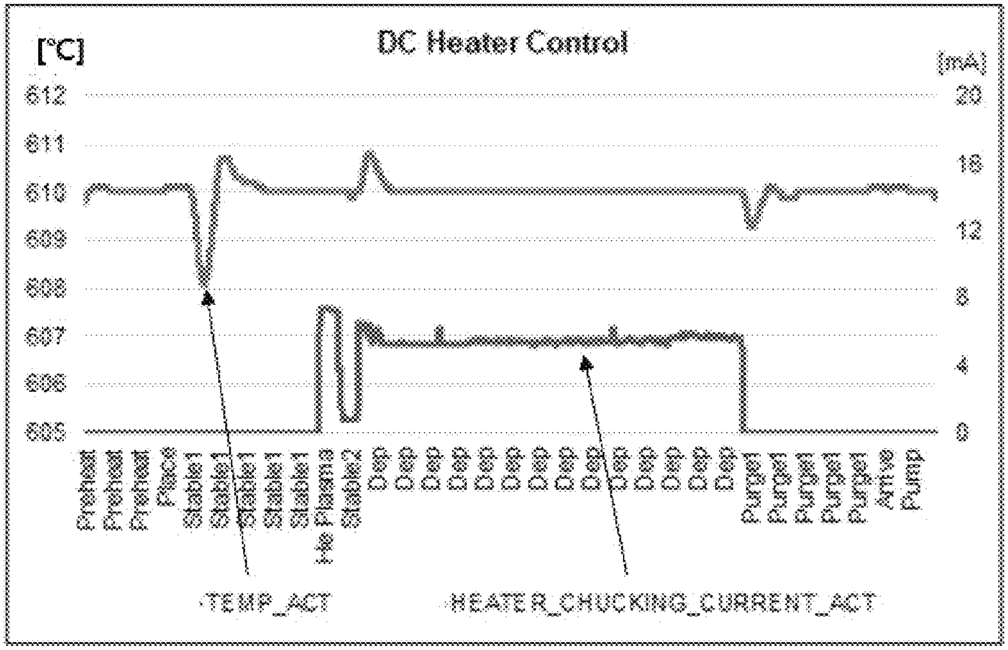
Figure 11:
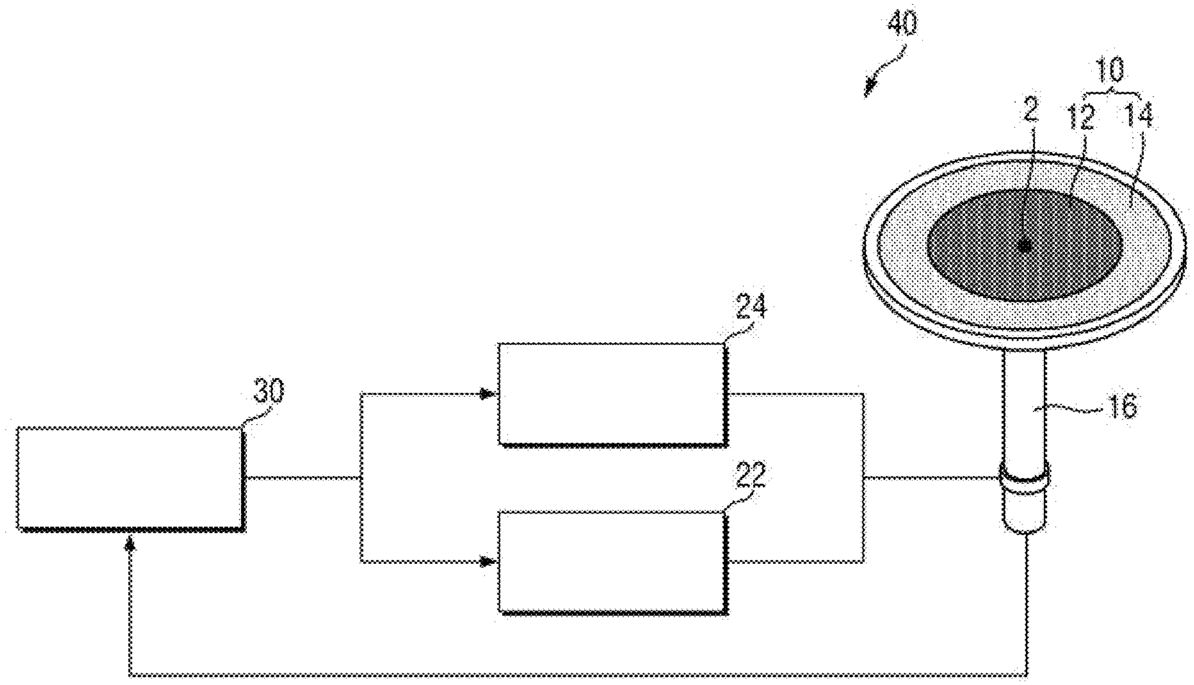
FIG. 11 is a view schematically showing the configuration of a substrate support unit according to the prior art.

The chucking current of the ESC electrode 150 in the susceptor 100 having the structure as shown in FIG. 9 is shown in FIGS. 10A to 10B. FIG. 10A is a graph showing chucking current of the ESC electrode when AC voltage is supplied in a device according to the prior art, and FIG. 10B is a graph showing chucking current of the ESC electrode when DC voltage is supplied by the chucking DC supply unit having the structure according to FIG. 8 of the present invention.

Referring to FIGS. 10A to 10B, it can be seen that the chucking current of the ESC electrode corresponds to approximately 5 to 6 mA when DC voltage is supplied, in the case where the process is progressed under the same condition. On the contrary, it can be seen that the chucking current of the ESC electrode corresponds to approximately 12 to 14 mA when AC voltage is supplied. As a result, it can be seen that the chucking current of the ESC electrode when DC voltage is supplied is only about half of the chucking current of the ESC electrode when AC voltage is supplied. That is, it can be confirmed that the chucking efficiency has been improved by more than two times in the present invention compared to the structure using AC of the device according to the prior art, owing to the insulation and reduction in the leakage current, as well as using DC.

In addition, when the resistance elements of the susceptor 100 are controlled by DC voltage as shown in the present invention, electrostatic force is increased as the leakage current is minimized, and in addition, it is also effective in preventing dissipation of electrostatic force and arcing generated due to insulation breakdown.

According to the present invention having the configuration as described above, the temperature of each area can be accurately measured even when a substrate is heated by dividing the substrate support unit into two or more areas.

In addition, according to the present invention, even when the output changes instantaneously, an accurate temperature of the substrate support unit can be derived by calculating an accurate resistance value.

Furthermore, according to the present invention, as DC voltage is used, leakage current that may be generated in an existing structure that uses AC voltage can be prevented, and ESC chucking efficiency can be improved through insulation of a DC voltage supply terminal.

Although it has been described above with reference to preferred embodiments of the present invention, those skilled in the art may variously modify and change the present invention within the scope without departing from the spirit and scope of the present invention disclosed in the claims described below. Therefore, when the modified implementations basically include the elements of the claims of the present invention, all of them should be considered to be included in the technical scope of the present invention.

What is claimed is:

1. A substrate support unit comprising:

a susceptor supporting a substrate;

a resistance element provided in the susceptor to heat the substrate;

a DC supply unit directly connected to the resistance element to apply DC voltage; and a control unit for calculating a temperature of the resistance element by measuring a voltage value and a resistance value of the resistance element and adjusting the temperature of the resistance element through controlling the DC voltage, wherein the susceptor is divided into two or more areas, the resistance element is disposed in each of the two or more areas, and the DC supply unit is directly connected to each of the resistance elements disposed in the two or more areas to apply the DC voltage independently, wherein two or more DC supply units are provided to be independently connected to each of the resistance elements.

2. The unit according to claim 1, wherein the susceptor is divided into a first area disposed in a center region and a second area disposed in an edge region, and the resistance element includes a first resistance element disposed in the first area and a second resistance element disposed in the second area.

3. The unit according to claim 1, wherein the control unit is provided with an analog-digital converter (ADC) channel for processing a voltage value of the resistance element and an analog-digital converter channel for processing resistance values of the resistance element.

4. The unit according to claim 1, wherein a resistance-temperature table in which the resistance values of the resistance element are converted into temperatures is stored in the control unit.

5. The unit according to claim 4, wherein the temperatures in the resistance-temperature table are determined by an equation according to resistances and temperatures of the resistance element.

6. The unit according to claim 5, wherein the temperatures in the resistance-temperature table are provided through calibration of calculating a resistance value per unit temperature or a temperature coefficient of resistance (a) by directly measuring the temperatures of the resistance element or the substrate.

7. The unit according to claim 1, wherein the DC supply unit includes an AC input terminal for receiving AC voltage, a transformer, a rectifier for converting AC to DC, and a DC output terminal for outputting DC voltage, and an insulation member is included in the transformer.

8. The unit according to claim 7, wherein the susceptor further includes an electrostatic chuck (ESC) electrode for chucking the substrate.

9. A temperature control method of a substrate supporting unit having a susceptor provided with a resistance element for heating a substrate, the method comprising the steps of:

measuring a resistance value of the resistance element;

calculating a temperature of the resistance element corresponding to the measured resistance value; and generating a resistance-temperature table including the resistance value and the temperature of the resistance element by repeating the steps of measuring a resistance value of the resistance element and calculating a temperature corresponding to the measured resistance value, wherein the method further comprises, after the step of calculating a temperature corresponding to the measured resistance value, the step of providing the temperature of the resistance-temperature table through calibration of calculating a resistance value per unit temperature or a temperature coefficient of resistance (a) by directly measuring the temperature of the resistance element or the substrate.

10. The method according to claim 9, further comprising the step of adjusting the temperature of the resistance element in a process for the substrate, wherein the step of adjusting the temperature of the resistance element includes the steps of:

supplying DC voltage to the resistance element from a DC supply unit;

measuring a resistance value of the resistance element;

extracting a temperature corresponding to the measured resistance value of the resistance from the resistance-temperature table; and adjusting the DC voltage supplied from the DC supply unit to the resistance element by comparing the extracted temperature value with a temperature required in a process for the substrate.

11. A substrate support unit comprising:

a susceptor supporting a substrate;

a resistance element provided in the susceptor to heat the substrate;

a DC supply unit directly connected to the resistance element to apply DC voltage; and a control unit for calculating a temperature of the resistance element by measuring a voltage value and a resistance value of the resistance element and adjusting the temperature of the resistance element through controlling the DC voltage, wherein the susceptor is divided into two or more areas, the resistance element is disposed in each of the two or more areas, and the DC supply unit is directly connected to each of the resistance elements disposed in the two or more areas to apply the DC voltage independently, and wherein the susceptor is divided into a first area disposed in a center region and a second area disposed in an edge region, and the resistance element includes a first resistance element disposed in the first area and a second resistance element disposed in the second area.

12. A substrate support unit comprising:

a susceptor supporting a substrate;

a resistance element provided in the susceptor to heat the substrate;

a DC supply unit directly connected to the resistance element to apply DC voltage; and a control unit for calculating a temperature of the resistance element by measuring a voltage value and a resistance value of the resistance element and adjusting the temperature of the resistance element through controlling the DC voltage, wherein a resistance-temperature table in which the resistance values of the resistance element are converted into temperatures is stored in the control unit, wherein the temperatures in the resistance-temperature table are determined by an equation according to resistances and temperatures of the resistance element, and wherein the temperatures in the resistance-temperature table are provided through calibration of calculating a resistance value per unit temperature or a temperature coefficient of resistance (a) by directly measuring the temperatures of the resistance element or the substrate.

13. A substrate support unit comprising:

a susceptor supporting a substrate;

a resistance element provided in the susceptor to heat the substrate;

a DC supply unit directly connected to the resistance element to apply DC voltage; and a control unit for calculating a temperature of the resistance element by measuring a voltage value and a resistance value of the resistance element and adjusting the temperature of the resistance element through controlling the DC voltage, wherein the DC supply unit includes an AC input terminal for receiving AC voltage, a transformer, a rectifier for converting AC to DC, and a DC output terminal for outputting DC voltage, and an insulation member is included in the transformer.

* * * * *